(12) United States Patent
Hwang et al.

(10) Patent No.: US 10,094,448 B2
(45) Date of Patent: Oct. 9, 2018

(54) PLANETARY GEAR TRAIN OF AUTOMATIC TRANSMISSION FOR VEHICLE

(71) Applicant: Hyundai Motor Company, Seoul (KR)

(72) Inventors: Dong Hwan Hwang, Seoul (KR); Seong Wook Hwang, Gunpo-si (KR); Seongwook Ji, Gunpo-si (KR); Chang Wook Lee, Suwon-si (KR); Hyun Sik Kwon, Seoul (KR); Jong Sool Park, Hwaseong-si (KR); SeokJin Kim, Hwaseong-si (KR); Kyeong Hun Lee, Seoul (KR); Wonmin Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 165 days.

(21) Appl. No.: 15/333,801

(22) Filed: Oct. 25, 2016

(65) Prior Publication Data

US 2017/0167579 A1    Jun. 15, 2017

(30) Foreign Application Priority Data

Dec. 10, 2015 (KR) .......................... 10-2015-0176322

(51) Int. Cl.
*F16H 3/46* (2006.01)
*F16H 3/66* (2006.01)

(52) U.S. Cl.
CPC ............... *F16H 3/666* (2013.01); *F16H 3/66* (2013.01); *F16H 2200/0065* (2013.01); *F16H 2200/2012* (2013.01); *F16H 2200/2046* (2013.01)

(58) Field of Classification Search
CPC .... F16H 3/666; F16H 3/66; F16H 2200/0065; F16H 2200/2012; F16H 2200/2046
See application file for complete search history.

(56) References Cited

U.S. PATENT DOCUMENTS 7,985,159 B2    7/2011  Phillips et al.
2013/0260947 A1* 10/2013  Mellet ...................... F16H 3/62
                                                475/276

FOREIGN PATENT DOCUMENTS

JP      2014-500463 A    1/2014
KR   10-2012-0132021 A   12/2012
WO    WO 2013/146025 A1  10/2013

* cited by examiner

*Primary Examiner* — Mark J Beauchaine
(74) *Attorney, Agent, or Firm* — Morgan, Lewis & Bockius LLP

(57) ABSTRACT

A planetary gear train of an automatic transmission for a vehicle may include an input shaft receiving torque of an engine, an output shaft outputting changed torque of the engine, a first planetary gear set including a first rotation element, a second rotation element, and a third rotation element, a second planetary gear set including a fourth rotation element, a fifth rotation element, and a sixth rotation element, a third planetary gear set including a seventh rotation element, an eighth rotation element, and a ninth rotation element, and a fourth planetary gear set including a tenth rotation element, an eleventh rotation element, and a twelfth rotation element.

10 Claims, 2 Drawing Sheets

FIG. 2

| speed stages | control element | | | | | | gear ratio | step ratio | gear ratio span |
|---|---|---|---|---|---|---|---|---|---|
| | C1 | C2 | C3 | B1 | B2 | B3 | | | |
| D1 | | | ● | ● | | ● | 5.646 | 1.646 | 9.473 |
| D2 | | ● | ● | | | ● | 3.430 | 1.534 | |
| D3 | ● | ● | | ● | | ● | 2.236 | 1.349 | |
| D4 | ● | | | ● | | ● | 1.657 | 1.329 | |
| D5 | ● | ● | | ● | | | 1.247 | 1.247 | |
| D6 | ● | ● | ● | | | | 1.000 | 1.145 | |
| D7 | ● | | ● | ● | | | 0.873 | 1.196 | |
| D8 | ● | | | ● | ● | | 0.730 | 1.225 | |
| D9 | ● | | | ● | ● | | 0.596 | | |
| REV | | | | ● | ● | ● | -4.150 | - | - |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0176322, filed Dec. 10, 2015, the entire contents of which is incorporated herein for all purposes by this by reference.

BACKGROUND OF THE INVENTION

Field of the Invention

The present invention relates to an automatic transmission for a vehicle. More particularly, the present invention relates to a planetary gear train of an automatic transmission for a vehicle that improves power delivery performance and fuel economy by achieving at least nine forward speed stages and widening speed ratio (or gear ratio) with a minimum number of constituent elements being used, and secures linearity of step ratios.

Description of Related Art

Recent increases in oil prices are triggering stiff competition among auto-makers in enhancing fuel consumption of a vehicle.

Such an automatic transmission achieving more speed stages is necessary to maximize power performance and driving efficiency according to downsizing of an engine. Particularly, it is desperately needed to develop high efficiency multiple-speed stage transmissions having excellent linearity of step ratios that can be used as an index closely related to drivability such as acceleration before and after shift, and rhythmical engine speed in order to secure competitiveness of automatic transmission field.

However, in the automatic transmission, as the number of speed stages increase, the number of internal components increase, and as a result, mountability, cost, weight, transmission efficiency, and the like may still deteriorate.

Accordingly, development of a planetary gear train which may achieve maximum efficiency with a small number of components is important in order to increase a fuel efficiency enhancement effect through the multiple-speeds.

In this aspect, in recent years, 8-speed automatic transmissions tend to be implemented and the research and development of a planetary gear train capable of implementing more speed stages has also been actively conducted.

However, since a conventional 8-speed automatic transmission has a gear ratio span of 6.5-7.5 (gear ratio span is an important factor for securing linearity of step ratios), improvement of power performance and fuel economy may not be great.

In addition, if an 8-speed automatic transmission has gear ratio span larger than 9.0, it is hard to secure linearity of step ratios. Therefore, driving efficiency of an engine and drivability of a vehicle may be deteriorated, and thus, development of high efficiency automatic transmissions which achieve at least nine forward speed stages is necessary.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving power delivery performance and fuel economy by achieving nine forward speed stages and one reverse speed stage, and widening gear ratio span and of securing linearity of step ratios.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, and a fourth planetary gear set including tenth, eleventh, and twelfth rotation elements, in which the input shaft may be directly connected to the second rotation element, the output shaft may be directly connected to the eleventh rotation element, the first rotation element may directly connect the sixth rotation element with the tenth rotation element, the second rotation element may be directly connected to the fourth rotation element, the fifth rotation element may be directly connected to the ninth rotation element, and the seventh rotation element may be selectively connectable to a transmission housing.

The eighth rotation element may be selectively connectable to the transmission housing, the twelfth rotation element may be selectively connectable to the transmission housing, the third rotation element may be selectively connectable to the eleventh rotation element, the eighth rotation element may be selectively connectable to the input shaft, and the first rotation element may be selectively connectable to the eighth rotation element.

The first, second, and third rotation elements may be a first sun gear, a first planet carrier, and a first ring gear, the fourth, fifth, and sixth rotation elements may be a second sun gear, a second ring gear, and a second planet carrier, the seventh, eighth, and ninth rotation elements may be a third sun gear, a third planet carrier, and a third ring gear, and the tenth, eleventh, and twelfth rotation elements may be a fourth sun gear, a fourth planet carrier, and a fourth ring gear.

According to various aspects of the present invention, a planetary gear train of an automatic transmission for a vehicle may include an input shaft receiving torque of an engine, an output shaft outputting changed torque of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, a first rotation shaft directly connecting the first rotation element with the sixth rotation element and the tenth rotation element, a second rotation shaft directly connecting the second rotation element with the fourth rotation element and directly connected to the input shaft, a third rotation shaft directly connected to the third rotation element, a fourth rotation shaft directly connecting the fifth rotation element with the ninth rotation element, a fifth rotation shaft directly connected to the seventh rotation element and selectively connectable to a transmission housing, a sixth rotation shaft directly connected to the eighth rotation element, selectively connectable to at least one of the first rotation shaft and the second rotation shaft, and selectively connectable to the transmission housing, a seventh rotation shaft directly connected to the eleventh rotation element, selectively connectable to the third rotation shaft, and directly connected to the output shaft, and an eighth rotation shaft directly connected to the twelfth rotation element and selectively connectable to the transmission housing.

The first planetary gear set may be a single pinion planetary gear set, the first rotation element may be a first sun gear, the second rotation element may be a first planet carrier, and the third rotation element may be a first ring gear, the second planetary gear set may be a double pinion planetary gear set, the fourth rotation element may be a second sun gear, the fifth rotation element may be a second ring gear, and the sixth rotation element may be a second planet carrier, the third planetary gear set may be a single pinion planetary gear set, the seventh rotation element may be a third sun gear, the eighth rotation element may be a third planet carrier, and the ninth rotation element may be a third ring gear, and the fourth planetary gear set may be a single pinion planetary gear set, the tenth rotation element may be a fourth sun gear, the eleventh rotation element may be a fourth planet carrier, and the twelfth rotation element may be a fourth ring gear.

The planetary gear train may further include a first clutch selectively connecting the third rotation shaft with the seventh rotation shaft, a second clutch selectively connecting the second rotation shaft with the sixth rotation shaft, a third clutch selectively connecting the first rotation shaft with the sixth rotation shaft, a first brake selectively connecting the sixth rotation shaft with the transmission housing, a second brake selectively connecting the fifth rotation shaft with the transmission housing, and a third brake selectively connecting the eighth rotation shaft with the transmission housing.

A first forward speed stage may be achieved by operation of the third clutch and the first and third brakes, a second forward speed stage may be achieved by operation of the second and third clutches and the third brake, a third forward speed stage may be achieved by operation of the second clutch and the first and third brakes, a fourth forward speed stage may be achieved by operation of the first clutch and the first and third brakes, a fifth forward speed stage may be achieved by operation of the first and second clutches and the first brake, a sixth forward speed stage may be achieved by operation of the first, second, and third clutches, a seventh forward speed stage may be achieved by operation of the first and third clutches and the first brake, an eighth forward speed stage may be achieved by operation of the first and third clutches and the second brake, a ninth forward speed stage may be achieved by operation of the first clutch and the first and second brakes, and a reverse speed stage may be achieved by operation of the first, second, and third brakes.

According to various aspects of the present invention, a planetary gear train of an automatic transmission for a vehicle may include an input shaft receiving torque of an engine, an output shaft outputting changed torque, a first planetary gear set comprising a single pinion planetary gear set and including first, second, and third rotation elements, a second planetary gear set comprising a double pinion planetary gear set and including fourth, fifth, and sixth rotation elements, a third planetary gear set comprising a single pinion planetary gear set and including seventh, eighth, and ninth rotation elements, a fourth planetary gear set comprising a single pinion planetary gear set and including tenth, eleventh, and twelfth rotation elements, a first rotation shaft directly connecting the first rotation element with the sixth rotation element and the tenth rotation element, a second rotation shaft directly connecting the second rotation element with the fourth rotation element and directly connected to the input shaft, a third rotation shaft directly connected to the third rotation element, a fourth rotation shaft directly connecting the fifth rotation element with the ninth rotation element, a fifth rotation shaft directly connected to the seventh rotation element and selectively connectable to a transmission housing, a sixth rotation shaft directly connected to the eighth rotation element, selectively connectable to at least one of the first rotation shaft and the second rotation shaft, and selectively connectable to the transmission housing, a seventh rotation shaft directly connected to the eleventh rotation element, selectively connectable to the third rotation shaft, and directly connected to the output shaft, an eighth rotation shaft directly connected to the twelfth rotation element and selectively connectable to the transmission housing, a first clutch selectively connecting the third rotation shaft with the seventh rotation shaft, a second clutch selectively connecting the second rotation shaft with the sixth rotation shaft, a third clutch selectively connecting the first rotation shaft with the sixth rotation shaft, a first brake selectively connecting the sixth rotation shaft with the transmission housing, a second brake selectively connecting the fifth rotation shaft with the transmission housing, and a third brake selectively connecting the eighth rotation shaft with the transmission housing. Various embodiments of the present invention achieve at least nine forward speed stages and one reverse speed stage by combining four planetary gear sets being simple planetary gear sets with six control elements.

In addition, since gear ratio span greater than 9.0 is secured, driving efficiency of the engine is maximized.

Furthermore, since linearity of step ratios is secured due to multiple speed stages, drivability such as acceleration before and after shift, rhythmical engine speed, and so on are improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to various embodiments of the present invention.

Figure 1:
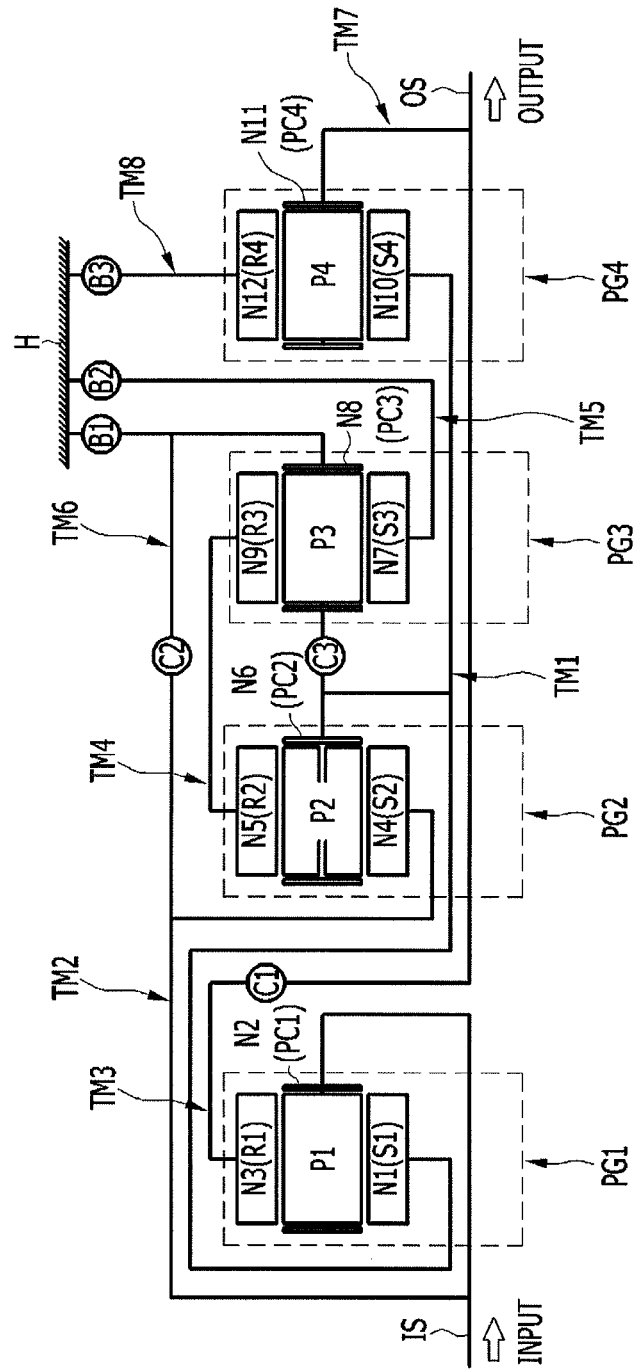
FIG. 1 is a schematic diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiments of the present invention.

Referring to FIG. 1, a planetary gear train according to various embodiments of the present invention includes first, second, third, and fourth planetary gear sets PG1, PG2, PG3, and PG4 disposed on the same axis, an input shaft IS, an output shaft OS, eight shafts TM1 to TM8 connected to at least one of rotation elements of the first, second, third, and fourth planetary gear sets PG1, PG2, PG3, and PG4, six control elements C1 to C3 and B1 to B3, and a transmission housing H.

Torque input from the input shaft IS is changed by cooperation of the first, second, third, and fourth planetary gear sets PG1, PG2, PG3, and PG4, and the changed torque is output through the output shaft OS.

The planetary gear sets are disposed in a sequence of the first, second, third, and fourth planetary gear sets PG1, PG2, PG3, and PG4 from an engine.

The input shaft IS is an input member and the torque from a crankshaft of an engine, after being torque-converted through a torque converter, is input into the input shaft IS.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a double pinion planetary gear set and includes a second sun gear S2, a second ring gear R2 internally meshed with a second pinion gear P2 externally meshed with the second sun gear S2, and a second planet carrier PC2 rotatably supporting the second pinion gear P2 as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The first rotation element N1 is directly connected to the sixth rotation element N6 and the tenth rotation element N10, the second rotation element N2 is directly connected to the fourth rotation element N4, and the fifth rotation element N5 is directly connected to the ninth rotation element N9 such that the first, second, third, and fourth planetary gear sets PG1, PG2, PG3, and PG4 include eight rotation shafts TM1 to TM8.

The eight shafts TM1 to TM8 will be described in further detail.

The first rotation shaft TM1 directly connects the first rotation element N1 (first sun gear S1) with the sixth rotation element N6 (second planet carrier PC2) and the tenth rotation element N10 (fourth sun gear S4).

The second rotation shaft TM2 directly connects the second rotation element N2 (first planet carrier PC1) with the fourth rotation element N4 (second sun gear S2) and is directly connected to the input shaft IS so as to be operated as an input element continuously.

The third rotation shaft TM3 is directly connected to the third rotation element N3 (first ring gear R1).

The fourth rotation shaft TM4 directly connects the fifth rotation element N5 (second ring gear R2) with the ninth rotation element N9 (third ring gear R3).

The fifth rotation shaft TM5 is directly connected to the seventh rotation element N7 (third sun gear S3) and is selectively connectable to the transmission housing H so as to be operated as a selective fixed element.

The sixth rotation shaft TM6 is directly connected to the eighth rotation element N8 (third planet carrier PC3), is selectively connectable to the first rotation shaft TM1 or the second rotation shaft TM2, and is selectively connectable to the transmission housing H so as to be operated as a selective fixed element.

The seventh rotation shaft TM7 is directly connected to the eleventh rotation element N11 (fourth planet carrier PC4), is selectively connectable to the third rotation shaft TM3, and is directly connected to the output shaft OS so as to be continuously operated as an output element.

The eighth rotation shaft TM8 is directly connected to the twelfth rotation element N12 (fourth ring gear R4) and is selectively connectable to the transmission housing H so as to be operated as a selective fixed element.

In addition, three clutches C1, C2, and C3 that are control elements are disposed at portions at which two rotation shafts among the rotation shafts TM1 to TM8 are selectively connectable to each other.

In addition, three brakes B1, B2, and B3 that are control elements are disposed at portions at which any one rotation shaft among the rotation shafts TM1 to TM8 is selectively connectable to the transmission housing H.

Arrangements of the six control elements C1 to C3 and B1 to B3 are described in detail.

The first clutch C1 is disposed between the third rotation shaft TM3 and the seventh rotation shaft TM7 and selectively connects the third rotation shaft TM3 with the seventh rotation shaft TM7.

The second clutch C2 is disposed between the second rotation shaft TM2 and the sixth rotation shaft TM6 and selectively connects the second rotation shaft TM2 with the sixth rotation shaft TM6.

The third clutch C3 is disposed between the first rotation shaft TM1 and the sixth rotation shaft TM6 and selectively connects the first rotation shaft TM1 with the sixth rotation shaft TM6.

The first brake B1 is disposed between the sixth rotation shaft TM6 and the transmission housing H and causes the sixth rotation shaft TM6 to be operated as a selective fixed element.

The second brake B2 is disposed between the fifth rotation shaft TM5 and the transmission housing H and causes the fifth rotation shaft TM5 to be operated as a selective fixed element.

The third brake B3 is disposed between the eighth rotation shaft TM8 and the transmission housing H and causes the eighth rotation shaft TM8 to be operated as a selective fixed element.

The control elements including the first, second, and third clutches C1, C2, and C3 and the first, second, and third brakes B1, B2, and B3 may be multi-plates friction elements of wet type that are operated by hydraulic pressure.

FIG. 2 is an operation chart of control elements at each speed stage in the planetary gear train according to various embodiments of the present invention.

As shown in FIG. 2, three control elements are operated at each speed stage in the planetary gear train according to the various embodiments of the present invention.

The third clutch C3 and the first and third brakes B1 and B3 are operated at a first forward speed stage D1.

In a state that the first rotation shaft TM1 is connected to the sixth rotation shaft TM6 by operation of the third clutch C3, torque of the input shaft IS is input to the second rotation shaft TM2. In addition, the sixth and eighth rotation shafts TM6 and TM8 are operated as the fixed elements by operation of the first and third brakes B1 and B3. Therefore, the torque of the input shaft IS is shifted into the first forward speed stage, and the first forward speed stage is output through the output shaft OS connected to the seventh rotation shaft TM7.

The second and third clutches C2 and C3 and the third brake B3 are operated at a second forward speed stage D2.

In a state that the second rotation shaft TM2 is connected to the sixth rotation shaft TM6 by operation of the second clutch C2 and the first rotation shaft TM1 is connected to the sixth rotation shaft TM6 by operation of the third clutch C3, the torque of the input shaft IS is input to the second rotation shaft TM2. In addition, the eighth rotation shaft TM8 is operated as the fixed element by operation of the third brake B3. Therefore, the torque of the input shaft IS is shifted into the second forward speed stage, and the second forward speed stage is output through the output shaft OS connected to the seventh rotation shaft TM7.

The second clutch C2 and the first and third brakes B1 and B3 are operated at a third forward speed stage D3.

In a state that the second rotation shaft TM2 is connected to the sixth rotation shaft TM6 by operation of the second clutch C2, the torque of the input shaft IS is input to the second rotation shaft TM2. In addition the sixth and eighth rotation shafts TM6 and TM8 are operated as the fixed elements by operation of the first and third brakes B1 and B3. Therefore, the torque of the input shaft IS is shifted into the third forward speed stage, and the third forward speed stage is output through the output shaft OS connected to the seventh rotation shaft TM7.

The first clutch C1 and the first and third brakes B1 and B3 are operated at a fourth forward speed stage D4.

In a state that the third rotation shaft TM3 is connected to the seventh rotation shaft TM7 by operation of the first clutch C1, the torque of the input shaft IS is input to the second rotation shaft TM2. In addition, the sixth and eighth rotation shafts TM6 and TM8 are operated as the fixed elements by operation of the first and third brakes B1 and B3. Therefore, the torque of the input shaft IS is shifted into the fourth forward speed stage, and the fourth forward speed stage is output through the output shaft OS connected to the seventh rotation shaft TM7.

The first and second clutches C1 and C2 and the first brake B1 are operated at a fifth forward speed stage D5.

In a state that the third rotation shaft TM3 is connected to the seventh rotation shaft TM7 by operation of the first clutch C1 and the second rotation shaft TM2 is connected to the sixth rotation shaft TM6 by operation of the second clutch C2, the torque of the input shaft IS is input to the second rotation shaft TM2. In addition, the sixth rotation shaft TM6 is operated as the fixed element by operation of the first brake B1. Therefore, the torque of the input shaft IS is shifted into the fifth forward speed stage, and the fifth forward speed stage is output through the output shaft OS connected to the seventh rotation shaft TM7.

The first, second, and third clutches C1, C2, and C3 are operated at a sixth forward speed stage D6.

In a state that the third rotation shaft TM3 is connected to the seventh rotation shaft TM7 by operation of the first clutch C1, the second rotation shaft TM2 is connected to the sixth rotation shaft TM6 by operation of the second clutch C2, and the first rotation shaft TM1 is connected to the sixth rotation shaft TM6 by operation of the third clutch C3, the torque of the input shaft IS is input to the second rotation shaft TM2. In this case, the first, second, third, and fourth planetary gear sets PG1, PG2, PG3, and PG4 become lock-up states. Therefore, the torque of the input shaft IS is shifted into the sixth forward speed stage, and the sixth forward speed stage is output through the output shaft OS connected to the seventh rotation shaft TM7. At the sixth forward speed stage, the same rotation speed as the input shaft IS is output.

The first and third clutches C1 and C3 and the first brake B1 are operated at a seventh forward speed stage D7.

In a state that the third rotation shaft TM3 is connected to the seventh rotation shaft TM7 by operation of the first clutch C1 and the first rotation shaft TM1 is connected to the sixth rotation shaft TM6 by operation of the third clutch C3, the torque of the input shaft IS is input to the second rotation shaft TM2. In addition, the sixth rotation shaft TM6 is operated as the fixed element by operation of the first brake B1. Therefore, the torque of the input shaft IS is shifted into the seventh forward speed stage, and the seventh forward speed stage is output through the output shaft OS connected to the seventh rotation shaft TM7.

The first and third clutches C1 and C3 and the second brake B2 are operated at an eighth forward speed stage D8.

In a state that the third rotation shaft TM3 is connected to the seventh rotation shaft TM7 by operation of the first clutch C1 and the first rotation shaft TM1 is connected to the sixth rotation shaft TM6 by operation of the third clutch C3, the torque of the input shaft IS is input to the second rotation shaft TM2. In addition, the fifth rotation shaft TM5 is operated as the fixed element by operation of the second brake B2. Therefore, the torque of the input shaft IS is shifted into the eighth forward speed stage, and the eighth forward speed stage is output through the output shaft OS connected to the seventh rotation shaft TM7.

The first clutch C1 and the first and second brakes B1 and B2 are operated at a ninth forward speed stage D9.

In a state that the first rotation shaft TM1 is connected to the sixth rotation shaft TM6 by operation of the third clutch C3, the torque of the input shaft IS is input to the second rotation shaft TM2. In addition, the sixth and fifth shafts TM6 and TM5 are operated as the fixed elements by operation of the first and second brakes B1 and B2. Therefore, the torque of the input shaft IS is shifted into the ninth forward speed stage, and the ninth forward speed stage is output through the output shaft OS connected to the seventh rotation shaft TM7.

The first, second, and third brakes B1, B2, and B3 are operated at a reverse speed stage REV.

In a state that the torque of the input shaft IS is input to the second rotation shaft TM2, the sixth, fifth, and eighth rotation shafts TM6, TM5, and TM8 are operated as the fixed elements by operation of the first, second, and third brakes B1, B2, and B3. Therefore, the torque of the input shaft IS is shifted into the reverse speed stage, and the reverse speed stage is output through the output shaft OS connected to the seventh rotation shaft TM7.

The planetary gear train according to various embodiments of the present invention achieves at least nine forward speed stages and one reverse speed stage by combining four planetary gear sets PG1, PG2, PG3, and PG4 with three clutches C1, C2, and C3 and three brakes B1, B2, and B3.

In addition, since gear ratio span greater than 9.4 is secured, driving efficiency of the engine is maximized.

Furthermore, since linearity of step ratios may be secured due to multiple speed stages, drivability such as acceleration before and after shift, rhythmical engine speed, and so on are improved.

For convenience in explanation and accurate definition in the appended claims, the terms "upper", "lower", "inner" and "outer", "up," "down," "upper", "lower," "upwards," "downwards", "front", "rear", "back", "inside", "outside", "inwardly," "outwardly," "interior", "exterior", "inner," "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle including:
    an input shaft receiving torque of an engine,
    an output shaft outputting changed torque of the engine,
    a first planetary gear set including a first rotation element, a second rotation element, and a third rotation element,
    a second planetary gear set including a fourth rotation element, a fifth rotation element, and a sixth rotation element,
    a third planetary gear set including a seventh rotation element, an eighth rotation element, and a ninth rotation element, and
    a fourth planetary gear set including a tenth rotation element, an eleventh rotation element, and a twelfth rotation element,
    wherein the input shaft is directly connected to the second rotation element, the output shaft is directly connected to the eleventh rotation element,
    the first rotation element directly connects the sixth rotation element with the tenth rotation element,
    the second rotation element is directly connected to the fourth rotation element,
    the fifth rotation element is directly connected to the ninth rotation element, and
    the seventh rotation element is selectively connectable to a transmission housing.

2. The planetary gear train of claim 1, wherein
    the eighth rotation element is selectively connectable to the transmission housing,
    the twelfth rotation element is selectively connectable to the transmission housing,
    the third rotation element is selectively connectable to the eleventh rotation element,
    the eighth rotation element is selectively connectable to the input shaft, and
    the first rotation element is selectively connectable to the eighth rotation element.

3. The planetary gear train of claim 1, wherein
    the first rotation element, the second rotation element, and the third rotation element include a first sun gear, a first planet carrier, and a first ring gear,
    the fourth rotation element, the fifth rotation element, and the sixth rotation element include a second sun gear, a second ring gear, and a second planet carrier,
    the seventh rotation element, the eighth rotation element, and the ninth rotation element include a third sun gear, a third planet carrier, and a third ring gear, and
    the tenth rotation element, the eleventh rotation element, and the twelfth rotation element include a fourth sun gear, a fourth planet carrier, and a fourth ring gear.

4. A planetary gear train of an automatic transmission for a vehicle including:
    an input shaft receiving torque of an engine,
    an output shaft outputting changed torque of the engine,
    a first planetary gear set including a first rotation element, a second rotation element, and a third rotation element,
    a second planetary gear set including a fourth rotation element, a fifth rotation element, and a sixth rotation element,
    a third planetary gear set including a seventh rotation element, an eighth rotation element, and a ninth rotation element,
    a fourth planetary gear set including a tenth rotation element, an eleventh rotation element, and a twelfth rotation element,
    a first rotation shaft directly connecting the first rotation element with the sixth rotation element and the tenth rotation element,
    a second rotation shaft directly connecting the second rotation element with the fourth rotation element and directly connected to the input shaft,
    a third rotation shaft directly connected to the third rotation element,
    a fourth rotation shaft directly connecting the fifth rotation element with the ninth rotation element,
    a fifth rotation shaft directly connected to the seventh rotation element and selectively connectable to a transmission housing,
    a sixth rotation shaft directly connected to the eighth rotation element, selectively connectable to at least one of the first rotation shaft and the second rotation shaft, and selectively connectable to the transmission housing,
    a seventh rotation shaft directly connected to the eleventh rotation element, selectively connectable to the third rotation shaft, and directly connected to the output shaft, and an eighth rotation shaft directly connected to the twelfth rotation element and selectively connectable to the transmission housing.

5. The planetary gear train of claim 4, wherein the first planetary gear set is a single pinion planetary gear set, the first rotation element is a first sun gear, the second rotation element is a first planet carrier, and the third rotation element is a first ring gear, the second planetary gear set is a double pinion planetary gear set, the fourth rotation element is a second sun gear, the fifth rotation element is a second ring gear, and the sixth rotation element is a second planet carrier, the third planetary gear set is a single pinion planetary gear set, the seventh rotation element is a third sun gear, the eighth rotation element is a third planet carrier, and the ninth rotation element is a third ring gear, and the fourth planetary gear set is a single pinion planetary gear set, the tenth rotation element is a fourth sun gear, the eleventh rotation element is a fourth planet carrier, and the twelfth rotation element is a fourth ring gear.

6. The planetary gear train of claim 4, further including:
a first clutch selectively connecting the third rotation shaft with the seventh rotation shaft,
a second clutch selectively connecting the second rotation shaft with the sixth rotation shaft,
a third clutch selectively connecting the first rotation shaft with the sixth rotation shaft,
a first brake selectively connecting the sixth rotation shaft with the transmission housing,
a second brake selectively connecting the fifth rotation shaft with the transmission housing, and
a third brake selectively connecting the eighth rotation shaft with the transmission housing.

7. The planetary gear train of claim 6, wherein a first forward speed stage is achieved by operation of the third clutch and the first and third brakes,
a second forward speed stage is achieved by operation of the second and third clutches and the third brake,
a third forward speed stage is achieved by operation of the second clutch and the first and third brakes,
a fourth forward speed stage is achieved by operation of the first clutch and the first and third brakes,
a fifth forward speed stage is achieved by operation of the first clutch and the second clutch and the first brake,
a sixth forward speed stage is achieved by operation of the first, second, and third clutches,
a seventh forward speed stage is achieved by operation of the first and third clutches and the first brake,
an eighth forward speed stage is achieved by operation of the first and third clutches and the second brake,
a ninth forward speed stage is achieved by operation of the first clutch and the first and second brakes, and
a reverse speed stage is achieved by operation of the first, second, and third brakes.

8. A planetary gear train of an automatic transmission for a vehicle including:
an input shaft receiving torque of an engine,
an output shaft outputting changed torque,
a first planetary gear set including a single pinion planetary gear set and including a first rotation element, a second rotation element, and a third rotation element,
a second planetary gear set including a double pinion planetary gear set and including a fourth rotation element, a fifth rotation element, and a sixth rotation element,
a third planetary gear set including a single pinion planetary gear set and including a seventh rotation element, an eighth rotation element, and a ninth rotation element,
a fourth planetary gear set including a single pinion planetary gear set and including a tenth rotation element, an eleventh rotation element, and a twelfth rotation element,
a first rotation shaft directly connecting the first rotation element with the sixth rotation element and the tenth rotation element,
a second rotation shaft directly connecting the second rotation element with the fourth rotation element and directly connected to the input shaft,
a third rotation shaft directly connected to the third rotation element,
a fourth rotation shaft directly connecting the fifth rotation element with the ninth rotation element,
a fifth rotation shaft directly connected to the seventh rotation element and selectively connectable to a transmission housing,
a sixth rotation shaft directly connected to the eighth rotation element, selectively connectable to at least one of the first rotation shaft and the second rotation shaft, and selectively connectable to the transmission housing,
a seventh rotation shaft directly connected to the eleventh rotation element, selectively connectable to the third rotation shaft, and directly connected to the output shaft,
an eighth rotation shaft directly connected to the twelfth rotation element and selectively connectable to the transmission housing,
a first clutch selectively connecting the third rotation shaft with the seventh rotation shaft,
a second clutch selectively connecting the second rotation shaft with the sixth rotation shaft,
a third clutch selectively connecting the first rotation shaft with the sixth rotation shaft,
a first brake selectively connecting the sixth rotation shaft with the transmission housing,
a second brake selectively connecting the fifth rotation shaft with the transmission housing, and
a third brake selectively connecting the eighth rotation shaft with the transmission housing.

9. The planetary gear train of claim 8, wherein the first rotation element, the second rotation element, and the third rotation element include a first sun gear, a first planet carrier, and a first ring gear,
the fourth rotation element, the fifth rotation element, and the sixth rotation element include a second sun gear, a second ring gear, and a second planet carrier,
the seventh rotation element, the eighth rotation element, and the ninth rotation element include a third sun gear, a third planet carrier, and a third ring gear, and
the tenth rotation element, the eleventh rotation element, and the twelfth rotation element include a fourth sun gear, a fourth planet carrier, and a fourth ring gear.

10. The planetary gear train of claim 8, wherein a first forward speed stage is achieved by operation of the third clutch and the first and third brakes,
a second forward speed stage is achieved by operation of the second and third clutches and the third brake,
a third forward speed stage is achieved by operation of the second clutch and the first and third brakes,
a fourth forward speed stage is achieved by operation of the first clutch and the first and third brakes, a fifth forward speed stage is achieved by operation of the first clutch and the second clutch and the first brake,
a sixth forward speed stage is achieved by operation of the first, second, and third clutches,
a seventh forward speed stage is achieved by operation of the first and third clutches and the first brake,
an eighth forward speed stage is achieved by operation of the first and third clutches and the second brake,
a ninth forward speed stage is achieved by operation of the first clutch and the first and second brakes, and
a reverse speed stage is achieved by operation of the first, second, and third brakes.

\* \* \* \* \*